United States Patent
Kawabata et al.

(10) Patent No.: US 7,910,659 B2
(45) Date of Patent: *Mar. 22, 2011

(54) ACRYLIC SYRUP AND METHOD OF PRODUCING THE SAME

(75) Inventors: Tadashi Kawabata, Hiratsuka (JP); Shojiro Kuwahara, Hiratsuka (JP); Masahiro Kurokawa, Hiratsuka (JP)

(73) Assignee: Mitsubishi Gas Chemical Company, Inc. (JP)

(*) Notice: Subject to any disclaimer, the term of this patent is extended or adjusted under 35 U.S.C. 154(b) by 940 days.

This patent is subject to a terminal disclaimer.

(21) Appl. No.: 11/255,994

(22) Filed: Oct. 24, 2005

(65) Prior Publication Data
US 2006/0089463 A1    Apr. 27, 2006

Related U.S. Application Data

(63) Continuation of application No. 10/144,982, filed on May 15, 2002, now Pat. No. 7,056,984.

(30) Foreign Application Priority Data

May 15, 2001    (JP) ................... 2001-144149

(51) Int. Cl.
- *C08L 51/00* (2006.01)
- *C08L 51/04* (2006.01)
- *C08L 53/02* (2006.01)
- *C08F 257/02* (2006.01)

(52) U.S. Cl. ......... 525/242; 525/310; 525/301; 525/306
(58) Field of Classification Search .................. 525/244, 525/310, 242, 301, 306
See application file for complete search history.

(56) References Cited

U.S. PATENT DOCUMENTS

| | | | | |
|---|---|---|---|---|
| 4,100,228 A | * | 7/1978 | Dennis et al. | 525/244 |
| 5,578,673 A | * | 11/1996 | Ashton et al. | 524/517 |
| 7,056,984 B2 | * | 6/2006 | Kawabata et al. | 525/244 |

OTHER PUBLICATIONS

Karaenev et al. "Phase formation and Phase Inversion . . .", Journal of Polymer Science: Polymer Chemistry Edition, vol. 16, p. 337-342 (1978).*

* cited by examiner

*Primary Examiner* — Jeffrey C Mullis
(74) *Attorney, Agent, or Firm* — H. Jay Spiegel; Robert L. Haines

(57) ABSTRACT

Disclosed is an acrylic syrup containing a vinyl monomer (A) of methyl methacrylate and a polymerized solid component (B) which is a high polymer of said vinyl monomer and has a weight average molecular weight of from 30,000 to 2,000,000 as measured by the GPC and a viscosity at 25° C. of from 0.1 to 50 Pa·s, wherein at least part of said polymerized solid component (B) is a grafted rubber obtained by graft-polymerizing said vinyl monomer with a rubbery polymer, and said grafted rubber has a large branching coefficient. The acrylic resin molded articles obtained from the acrylic syrup exhibit excellent impact resistance.

3 Claims, No Drawings

ACRYLIC SYRUP AND METHOD OF PRODUCING THE SAME

CROSS REFERENCE TO RELATED APPLICATIONS

This application is a continuation of application Ser. No. 10/144,982, filed on May 15, 2002, the contents of which are incorporated herein by reference, which claims priority from Japanese Patent Application 2001-144149, filed May 15, 2001.

BACKGROUND OF THE INVENTION

1. Field of the Invention

The present invention relates to an acrylic syrup and to a method of producing the same. More specifically, the invention relates an acrylic syrup adapted to producing acrylic resin molded articles having excellent impact resistance and, particularly, to producing artificial marble and to a method of producing the acrylic syrup.

2. Description of the Related Art

An expansion in the market of acrylic resins in recent years is accompanied by a development of use of the acrylic resins as interior construction members, such as the use as an artificial acrylic marble.

The artificial acrylic marble is usually produced by mixing a polymerizable viscous liquid (acrylic syrup) comprising a methyl methacrylate as a chief component with an inorganic filler such as aluminum hydroxide, a crosslinking agent, an ornamental member and a polymerization initiator, polymerizing and solidifying the mixture into a plate by a cell-casting method or a continuous casting method, and cutting the plate into a desired size. Concrete examples of use of the artificial acrylic marble include kitchen counter, washstand, dressing table, bathtub, floor member and wall member.

The artificial acrylic marble is highly evaluated for its high-quality appearance and feasibility of design involving, however, such defects as being brittle and weak against shocks. Products produced from the artificial marble are likely to be broken during the transit, working, assembling or use and, hence, a countermeasure must be taken for preventing the products from being broken by shock.

If the impact resistance of the artificial marble could be improved, then, inconvenience involved in the handling such as during the transit of articles and during conducting various workings can be decreased and, besides, the thickness of the articles can be decreased. It is therefore very meaningful to develop an artificial acrylic marble having excellent impact resistance compared to that of conventional artificial acrylic marbles.

In order to impart impact resistance to the resins, it is widely accepted practice to modify the resins with a rubbery polymer. As the thermoplastic resins imparted with impact resistance by modification, there have been widely known an ABS resin and an HIPS resin which are produced by dissolving a rubbery polymer (hereinafter often referred to as rubbery component) in a monomer followed by polymerization, i.e., by graft-polymerizing the rubbery component with a monomer such as acrylonitrile or styrene. In order to improve impact resistance by the modification with a rubbery component, further, it is necessary that the rubbery component that is grafted (grafted rubber) is dispersed in the form of particles in the resin. For example, when the mass polymerization is conducted by using a monomer solution of the above-mentioned rubbery component, it has been known that the phase separation occurs as the monomer solution is polymerized and that the grafted rubber disperses in the form of particles due to the phase conversion as a certain polymerization conversion is exceeded. The shape and size of the thus dispersed grafted rubber particles affect the impact resistance, transparency and workability of the product resins. The ABS resin or the HIPS resin produced by the mass polymerization forms a special micro-structure in which a resin phase is contained in a rubber phase.

An attempt for improving the impact resistance by using the grafted rubber as described above, has also been conducted in the production of acrylic resins through an acrylic syrup. For example, Japanese Examined Patent Publication (Kokoku) No. 25215/1980 discloses a method of producing a rubber-reinforced acrylic resin by dissolving a rubbery polymer in a monomer which comprises a methyl methacrylate as a chief component, synthesizing a rubber-reinforced acrylic syrup by the batchwise mass polymerization, and removing the residual monomer under a reduced pressure. As the rubbery polymer, there is used a material which is rubbery at room temperature and is graft-copolymerizable with a monomer, such as a polybutadiene or a butadiene/styrene copolymer.

When the rubber-reinforced acrylic syrup is synthesized by the above-mentioned method, however, it becomes difficult to control the reaction since the polymerization initiator is added at one time in an amount necessary for the reaction. That is, abnormal acceleration of polymerization called gel effect becomes very conspicuous, and the reaction system becomes out of control, so that the content in the reaction vessel is quickly solidified or the polymer adheres on the inner walls of the reaction vessel and gradually grows thereon and turns into insoluble polymer causing the interior of the reaction vessel to be clogged, making it no longer possible to stably conduct the operation. Further, since the reaction is conducted under a reflux condition by raising the temperature after the polymerization initiator is once added, it becomes difficult to stably produce the products being affected by the rate of elevating the temperature, reflux amount and even by a slight change in the temperature.

In order to improve the above-mentioned problems, Japanese Unexamined Patent Publication (Kokai) No. 147514/1980 discloses a method of producing a rubber-reinforced acrylic syrup by the continuous flow-type mass polymerization. According to this production method, a rubber-reinforced acrylic syrup is obtained by continuously feeding a starting polymerization material obtained by dissolving a rubbery polymer in a monomer which comprises a methyl methacrylate as a chief component and feeding a starting monomer in which a radical polymerization initiator is dissolved, into a single reaction vessel, and by conducting the polymerization while continuously stirring the solution and controlling the temperature to lie from 90° C. to 200° C. and controlling an average residence time to be from 0.5 to 30 minutes. As the rubbery polymer, there is used a polybutadiene, a butadiene/styrene copolymer, a butadiene/acrylonitrile copolymer, an ethylene/vinyl acetate copolymer or a polyurethane. According to this method, however, the reaction vessel is fully filled with the liquid at all times arousing such a problem that the polymer adheres and gradually grows on the inner wall surfaces of the reaction vessel. Besides, since the polymerization temperature is high, a copolymer of a low molecular weight is formed much. As a result, if the acrylic resin obtained from such an acrylic syrup is molded, the resin is discolored and is molded defectively.

Further, Japanese Unexamined Patent Publication (Kokai) No. 302010/1997 discloses a method of decreasing the volume contraction factor during the curing in the production of an acrylic resin by adding a rubbery polymer to an acrylic syrup, and by dispersing the rubbery polymer in the form of particles having particle diameters of from 5 nm to 800 µm while stirring the acrylic syrup at a stirring speed of about 10,000 rpm by using a high-speed stirrer. According to this method, the rubbery polymer is dispersed in the acrylic syrup but has not been grafted (or the rubbery polymer is grafted very little even if it is grafted) offering an advantage of decreasing the contraction factor during the curing but without being capable of improving the impact resistance. This is due to the fact that the rubbery polymer particles have a low interfacial adhesion property permitting the interface to be peeled off. Further, the rubbery polymer dispersed on the surface of the acrylic resin precipitates causing a decrease in the surface hardness of the resin.

When the rubbery polymer is simply dissolved in the acrylic syrup, an extended period of time is required before it is completely dissolved, and the acrylic syrup and the rubbery polymer are gradually separated from each other and become inhomogeneous when the acrylic syrup is left to stand still, thus arousing a problem in the preservation stability of the syrup. When, for example, an acrylic resin plate is prepared by using a syrup in which the rubbery polymer is dissolved, the impact resistance is not at all improved and, besides, the surface hardness decreases as compared to that of the article to which no rubbery polymer is added.

As described above, though there has heretofore been proposed a method of producing a rubber-reinforced acrylic syrup adapted to the production of an acrylic resin having improved impact resistance relying upon a batchwise mass polymerization method or the continuous flow-type mass polymerization method, the impact resistance of the acrylic resin finally obtained has not yet been improved to a satisfactory degree. Besides, there has not yet been developed, either, a method of stably producing a rubber-reinforced acrylic syrup of a stable quality by using a simple apparatus.

SUMMARY OF THE INVENTION

It is an object of the present invention to provide an acrylic syrup adapted to improving the impact resistance of a finally obtained acrylic resin molded article (e.g., artificial marble) and a method of producing the acrylic syrup solving the above-mentioned problems inherent in the prior art.

According to the present invention, there is provided an acrylic syrup having a viscosity at 25° C. of from 0.1 to 50 Pa·s and containing a vinyl monomer (A) which comprises methyl methacrylate and a polymerized solid component (B) which is a high polymer of said vinyl monomer and has a weight average molecular weight of from 30,000 to 2,000,000 as measured by the GPC, wherein at least part of said polymerized solid component (B) is a grafted rubber obtained by graft-polymerizing said vinyl monomer with a rubbery polymer, and said grafted rubber has a branching coefficient with which the inclination of a straight line obtained by double-logarithmically plotting the RMS radius (z-average inertial radius) measurement and the molecular weights calculated from the GPC-MALLS (gel permeation chromatography-multi-angle laser light scattering), becomes 0.35 to 0.65 [nm/(g/mol)].

According to the present invention, there is further provided a method of preparing an acrylic syrup comprising steps of:
(i) preparing a starting solution by dissolving a rubbery polymer in a vinyl monomer containing at least 85% by weight of methyl methacrylate;
(ii) heating said starting solution in a nonoxidizing atmosphere and, then, adding a chain transfer agent to said starting solution under a reflux condition;
(iii) adding a polymerization initiator and a vinyl monomer which is for the post-addition containing at least 85% by weight of methyl methacrylate over a period of from 0.5 to 8 hours continuously or in a divided manner under a reflux condition after the chain transfer agent has been added; and
(iv) continuing the heating to conduct the reflux for from 0.01 to 10 hours after the polymerization initiator and the vinyl monomer for post-addition have been added.

According to the present invention, a starting solution is prepared by dissolving a rubbery polymer in a vinyl monomer that contains at least methyl methacrylate, a chain transfer agent is added to the starting solution under a reflux condition and, in this state, the remainder of the vinyl monomer and a polymerization initiator are added at predetermined rates to thereby conduct the graft-polymerization. Through this graft-polymerization, a grafted rubbery polymer (grafted rubber) is formed. The graft phase of the grafted rubber is favorably compatible with the monomer component. In the thus obtained acrylic syrup, therefore, the particles of the grafted rubber are homogeneously and stably dispersed. Besides, in the molded article produced from the above acrylic syrup, the acrylic resin phase and the grafted rubber are intimately adhered together to exhibit excellent impact resistance. Further, the grafted rubber formed in the acrylic syrup features a large branching coefficient. Being compounded by the large branching coefficient of the grafted rubber, the acrylic resin molded article that is finally obtained exhibits a further improved impact resistance. For example, the artificial marble obtained by adding a filler, a crosslinking agent and a curing agent to the acrylic syrup, exhibits excellent impact resistance without losing its inherent properties.

The branching coefficient of the grafted rubber is represented by the inclination of a straight line (hereinafter often referred to as RMS radius-molecular weight double-logarithmic line) obtained by double-logarithmically plotting the RMS radii (z-average inertial radii) and the molecular weights calculated from the GPC-MALLS measurement. When the inclinations are 0.33, 0.50 and 1.00 [nm/(g/mol)], the molecular chains correspond to a spherical shape, a random coil shape and a linear shape. The smaller the inclination, the larger the branching coefficient, i.e., the larger the number of the grafted chains formed in a rubber molecule. In the grafted rubber formed in the acrylic syrup of the present invention as will become obvious from Examples described later, the inclination of the RMS radius-molecular weight double logarithmic line is as low as 0.35 to 0.65 [nm/(g/mol)], manifesting a very large branching coefficient. As a result, a further improved impact resistance is brought about.

The polymerized solid component (B) in the acrylic syrup is a high polymer (weight average molecular weight of from 30,000 to 2,000,000) of the vinyl monomer (A) (chiefly methyl methacrylate). The content of the polymerized solid component (B) in the acrylic syrup can be calculated by, for example, throwing the acrylic syrup into cold hexane (usually, not higher than 20° C.) of a large amount (usually, not smaller than 1000 parts by weight per 100 parts by weight of the acrylic syrup), and drying the precipitate that is formed under a reduced pressure to thereby remove the vinyl monomer (A). The polymerized solid component (B) includes not only the polymer among the vinyl monomers (A) but also the grafted rubber in which the rubbery polymer is graft-polymerized with the vinyl monomer (A). The polymerized solid component (B) is contained in the syrup in such an amount that the acrylic syrup exhibits a viscosity at 25° C. of from 0.1 to 50 Pa·s.

DETAILED DESCRIPTION OF THE INVENTION

Preparation of Acrylic Syrup

If briefly described, the present invention has an important feature in the production of an acrylic syrup by employing a half-batch method as a polymerization method. According to this method, the heat of polymerization can be removed by utilizing the sensible heat of the starting material that is fed and the latent heat of vaporization, and the rate of polymerization can be controlled relying upon the rate of adding the monomer component containing the polymerization initiator, making it possible to effectively avoid abnormal acceleration of polymerization caused by the batchwise addition of the polymerization initiator that occurs in the batchwise mass polymerization. The synthesis can be further accomplished by using a general-purpose polymerization apparatus without requiring a great deal of laborious work for controlling the polymerization conditions and cost involved in the continuous flow-type mass polymerization method, and offering an advantage of stably conducting the synthesis without using a special reaction apparatus.

According to the present invention which employs the half-batch method as described above, the grafted rubber having a large branching coefficient is formed in the acrylic syrup that is obtained. The acrylic syrup of the present invention containing the grafted rubber having such a large branching coefficient, makes it possible to markedly improve the impact resistance of the acrylic resin molded article.

Preparation of the Starting Solution (i):

In the present invention, the starting solution is prepared by dissolving a rubbery polymer in a vinyl monomer containing at least methyl methacrylate.

Not less than 85% by weight of the vinyl monomer must be methyl methacrylate. When the amount of methyl methacrylate is smaller than 85% by weight, properties specific to the acrylic resin tend to be spoiled. For example, the artificial marble obtained from such an acrylic resin lacks high-quality appearance and feasibility of design. According to the present invention, therefore, it is allowed to use, in combination with methyl methacrylate, any other vinyl compound which is copolymerizable therewith but in an amount which is not more than 15% by weight of the vinyl monomer.

As other vinyl compounds copolymerizable with methyl methacrylate, though there is no particular limitation, there can be used those compounds having an ethylenic double bond such as vinyl cyanide compounds like acrylonitrile and methacrylonitrile; aromatic vinyl compounds like styrene, α-methylstyrene, dimethylstyrene, vinyltoluene and chlorostyrene; unsaturated carboxylic acids such as acrylic acid, methacrylic acid, maleic acid and fumaric acid; esters of unsaturated carboxylic acids (excluding methyl methacrylate), nitrylamide, imide, acid anhydride; vinyl carboxylates such as vinyl acetate, which may be used alone or in a combination of two or more kinds together with methyl methacrylate.

The rubbery polymer dissolved in the vinyl monomer is a substance which exhibits rubbery property at room temperature, and is graft-copolymerizable with methyl methacrylate and with any other vinyl monomer that is used as required. Examples of the rubbery polymer include acrylic rubber; conjugated diene rubbers such as polybutadiene, polyisoprene, butadiene/isoprene copolymer, polychloroprene, styrene/butadiene copolymer, acrylonitrile/butadiene copolymer, and acrylic acid ester/butadiene copolymer or hydrogenated products thereof; olefin rubbers such as ethylene/propylene copolymerized rubber, ethylene/propyrene/diene copolymerized rubber, ethylene/vinyl acetate copolymerized rubber and polyisobutylene rubber; silicone rubber, fluorine-contained rubber; and thermoplastic elastomer such as polyurethane elastomer and polyester elastomer, which may be used in one kind or in a combination of two or more kinds. In the present invention, the conjugated diene rubber is particularly preferably used.

It is desired that the rubbery polymer is usually used in an amount of from 1 to 20 parts, preferably 2 to 15 parts, most preferably 3 to 12 parts by weight per 100 parts by weight of the whole amount of the vinyl monomer that is used inclusive of the vinyl monomer component post-added in a step that will be described later. That is, when the amount of the rubbery polymer is smaller than the above-mentioned range, the acrylic resin made from the acrylic syrup exhibits insufficient impact resistance. When the amount of the rubbery polymer is greater than the above-mentioned range, on the other hand, the acrylic resin may fail to exhibit its excellent properties.

In the present invention, as required, a defoaming agent may be added to the starting solution so that when a final molded article is produced by using the acrylic syrup, evolution of the bubbles is suppressed and the foam is favorably removed during the molding. For example, the final products such as artificial acrylic marble and the like exhibit decreased proportion defective in the appearance and decreased mechanical defect.

As the defoaming agent, there is selectively used a substance which promotes the growth of bubbles in the liquid while suppressing the activity of the substance that stabilizes the bubbles without adversely affecting the polymerization reaction and the obtained product, or a substance having a property to destroy the bubbles on the surface and to lower the viscosity of the liquid.

Such defoaming agents have been described in "Plastic Additives", Big Chemie Japan Co. and "Kao's Lubricants for Plastics", Kao Co. Concretely speaking, though not limited thereto only, there can be used of an esterified product of glycerin and a fatty acid having not more than 30 carbon atoms (e.g., caprylic acid monoglyceride, lauric acid monoglyceride, myristic acid monoglyceride, palmitic acid monoglyceride, linoleic acid monoglyceride, oleic acid monoglyceride, stearic acid monoglyceride and behenic acid monoglyceride) in a single kind or in a combination of two or more kinds.

It is desired that the defoaming agent is added usually in an amount of not more than 0.3% by weight of the total amount of the whole vinyl monomer and the rubbery polymer used in the production process of the present invention. Even if the defoaming agent is added in an amount greater than 0.3% by weight, the defoaming effect is not improved but rather becomes disadvantageous from the standpoint of cost.

Addition of the Chain Transfer Agent (ii):

In the present invention, the starting solution prepared above is fed into a reaction apparatus (polymerization vessel) equipped with a reflux device, is heated in a nonoxidizing atmosphere such as nitrogen, and a chain transfer agent is added at a moment when the starting solution has reached a boiling point and the reflux has started.

As the chain transfer agent, it is desired to use those which yields a product of a desired molecular weight without impairing the polymerization reaction, such as mercaptans. Usually, there is used at least one kind of mercaptan having 4 to 20 carbon atoms, like 1-butanethiol, 2,2-dimethylethanethiol, 1-octanethiol, 2,2-dimethylhexanethiol, 1-dodecanethiol, 2,2-dimethyldecanethiol, 1-hexadecanethiol, 1-octadecanethiol, benzenethiol, thiocreosol or thionaphthol. The chain transfer agent is added in such an amount that a predetermined molecular weight is obtained. Usually, however, the chain transfer agent is added in an amount of not larger than 2% by weight and, particularly, from 0.01 to 1% by weight per the total amount of the whole vinyl monomer and the rubbery polymer used in the production process of the present invention.

It has been known that the polymerization proceeds little by little when the chain transfer agent is added to the monomer component. This tendency becomes great particularly when the mercaptans are used. When the temperature is raised in a state where the chain transfer agent is added to the starting solution, therefore, the rate of polymerization varies depending upon the rate of elevating the temperature and it becomes difficult to obtain the acrylic syrup and the acrylic resin having stable properties.

According to the present invention, therefore, there is prepared, first, a starting solution by using part of the vinyl monomer, the starting solution is fed into the reaction apparatus and is heated. Then, the chain transfer agent is added at a moment when the temperature of the starting solution has reached a boiling point and the reflux has started, prior to adding the polymerization initiator that will be described later and prior to post-adding the remainder of the vinyl monomer.

Post-Addition of the Vinyl Monomer and the Polymerization Initiator (iii):

According to the present invention, the polymerization is conducted based upon the half-batch method. Concretely speaking, the vinyl monomer and the polymerization initiator are continuously or intermittently added over a period of from 0.5 to 8 hours and, preferably, from 1 to 6 hours under the reflux condition after the chain transfer agent has been added. If these compounds are added at one time, the degree of polymerization and the molecular weight change so greatly that it becomes difficult to obtain the acrylic syrup of a stable quality and, besides, it becomes difficult to form the grafted rubber having a large branching coefficient. That is, since the polymerization is conducted relying upon the half-batch method as described above in the present invention, grafted chains of the vinyl monomer are newly formed on the molecules of the rubbery polymer during the polymerization and many grafted chains are formed per a molecule of the rubbery polymer. As a result, the grafted rubber formed in the acrylic syrup of the present invention exhibits such a large branching coefficient that the inclination of the RMS radius-molecular weight double logarithmic line is from 0.35 to 0.65 [nm/(g/mol)].

For example, when the vinyl monomer and the polymerization initiator are added within a period of time shorter than the above-mentioned range, changes in the degree of polymerization and in the molecular weight cannot be avoided, and it becomes difficult to obtain the acrylic syrup of a stable quality or to form a grafted rubber having a large branching coefficient. In fact, as will be demonstrated by Comparative Example 1 appearing later, when the polymerization is conducted relying upon the so-called continuous method, the inclination of the RMS radius-molecular weight double-logarithmic line of the formed grafted rubber is 0.74 [nm/(g/mol)], manifesting a branching coefficient considerably smaller than that of the present invention. Even when the vinyl monomer and the polymerization initiator are added over a period of time longer than the above-mentioned range, no distinguished merit is obtained and the productivity simply decreases.

In the present invention, the vinyl monomer and the polymerization initiator can be separately added afterward. Usually, however, it is desired that the two are simultaneously post-added by, for example, dissolving the polymerization initiator in the vinyl monomer to enhance the productivity.

The vinyl monomer that is post-added, too, contains at least not less than 85% by weight of methyl methacrylate like the vinyl monomer used for the preparation of the starting solution, and may contain a vinyl compound which is copolymerizable with methyl methacrylate in an amount of not larger than 15% by weight.

As the polymerization initiator, there can be used a variety of known radical polymerization initiators such as 2,2'-azobisisobutylonitrile, 2,2'-azobis(2,4-dimethylvaleronitrile), 2,2'-azobis(2,4-dimethyl-4-methoxyvaleronitrile), 1,1'-azobiscyclohexanecarbonitrile, 1,1,3,3-tetramethylbutylperoxy-2-ethyl hexanoate, di[4-t-butylcyclohexyl]peroxy dicarbonate, lauroyl peroxide, benzoyl peroxide, t-butyl pivarate, t-butylperoxy-2-ethyl hexanoate, diisopropylperoxy dicarbonate and/or bis(4-t-butylcyclohexyl)peroxy dicarbonate, in a single kind or in a combination of two or more kinds.

The polymerization initiator is used in an amount necessary for obtaining a desired rate of polymerization. The amount of use varies depending upon the composition of the vinyl monomer and upon the kind of the polymerization initiator but is, generally, from 0.0001 to 2.0% by weight and, particularly, from 0.001 to 1.0% by weight per the total amount of the whole vinyl monomer and the rubbery polymer used in the production process of the present invention. Upon using the polymerization initiator within the above-mentioned range, the vinyl monomer is polymerized and is graft-polymerized with the rubbery polymer to a predetermined degree of polymerization, and there is obtained the acrylic syrup that contains, in a predetermined amount, the polymerized solid component having a weight average molecular weight that lies over a predetermined range and that has a viscosity at 25° C. in a range of from 0.1 to 50 Pa·s.

Continuation of Reflux (iv):

In the present invention, heating is continued to continue the reflux for 0.01 to 10 hours and, particularly, for 0.05 to 5 hours after the vinyl monomer for post-addition and the polymerization initiator have been added.

That is, the polymerization reaction substantially starts at a moment when the addition of the polymerization initiator commences. In the present invention, however, the polymerization is conducted by continuing the reflux for the above-mentioned period of time after the post-addition of the vinyl monomer and the polymerization initiator has been finished. Due to the post-polymerization, the polymerization initiator is inactivated and the obtained acrylic syrup exhibits improved storage stability. When the post-polymerization time is shorter than the above-mentioned range, the acrylic syrup loses the storage stability since the active polymerization initiator remains in the acrylic syrup. When the polymerization time is longer than the above-mentioned range, on the other hand, the productivity simply decreases without any distinguished advantage.

In the present invention, it is desired to add a polymerization inhibitor after the polymerization reaction has been completed as a result of continuing the heating for a predetermined period of time as described above, and to take out the acrylic syrup by cooling after the polymerization inhibitor has been added.

That is, use of the polymerization inhibitor makes it possible to reliably prevent the obtained syrup from being polymerized and colored and, hence, to obtain the acrylic syrup of stable quality. The obtained acrylic syrup exhibits further improved storage stability. There is further obtained such an advantage that there is no need of effecting the processing for inactivating the mercaptan (chain transfer agent) remaining in small amounts in the acrylic syrup.

Though not being limited thereto only, examples of the polymerization inhibitor include such hindered phenol polymerization inhibitors as 2,6-di-t-butyl-4-methylphenol, 6-t-butyl-2,4-dimethylphenol, 4,4'-thiobis-(6-t-butyl-3-methylphenol), and 2,2'-methylenebis-(4-methyl-6-t-butylphenol), which may be used alone or in a combination of two or more kinds. Further, the amount of addition of the polymerization inhibitor is from 0.001 to 1% by weight and, particularly, from 0.005 to 0.5% by weight per the total amount of the whole vinyl monomer and of the rubbery polymer used in the production process of the present invention.

(Acrylic Syrup)

The acrylic syrup obtained above has been polymerized at a boiling point (about 100° C.) of the starting solution which is a relatively low temperature and, hence, contains the vinyl monomer (A)(chiefly methyl methacrylate) in an amount which is relatively as large as from 40 to 90% by weight and, particularly, from 45 to 88% by weight and the polymerized solid component (B) in an amount of from 10 to 60% by weight and, particularly, from 12 to 55% by weight, and the acrylic syrup has a viscosity at 25° C. of from 0.1 to 50 Pa·s and exhibits a very favorable moldability.

Further, the polymerized solid component (B) in the acrylic syrup has a weight average molecular weight of from 30,000 to 2,000,000 and, particularly, from 50,000 to 1,500,000 as measured by the GPC. The polymerized solid component (B) contains the rubbery polymer (grafted rubber) grafted with the vinyl monomer. The grafted rubber may have a weight average molecular weight (GPC) of 30,000 to 1,000,000, preferably 50,000 to 500,000, most preferably 50,000 to 300,000, and is dispersed having an average particle diameter of from 0.1 to 50 μm, particularly, from 0.5 to 30 μm and, more particularly, from 1 to 10 μm in the acrylic syrup. The grafted rubber exhibits such a very large branching coefficient that the inclination of the RMS radius-molecular weight double-logarithmic line is 0.35 to 0.65 [nm/(g/mol)], preferably 0.35 to 0.55 [nm/(g/mol)]. Since the grafted rubber particles having such a large branching coefficient have been homogeneously dispersed in the acrylic syrup, the acrylic resin molded articles produced by using the acrylic syrup, such as artificial marble and the like, exhibit properties inherent in the acrylic resin as well as excellent impact resistance. That is, when the branching coefficient of the grafted rubber particles is smaller than the above-mentioned range, the effect for improving the impact resistance becomes very small.

In the present invention, it is desired that the content of the grafted rubber is 2 to 35% by weight, particularly 3 to 25% by weight, more particularly 5 to 20% by weight, per the acryl syrup.

The grafted rubber particles formed in the acrylic syrup do not grow during the molding due to being cured. Therefore, the grafted rubber particles which are being dispersed maintaining the above average particle diameter can be confirmed by dying a very thinly cut piece of an acrylic resin molded article (e.g., resin plate) produced from the acrylic syrup with osmic acid and taking a picture of the surface thereof using a transmission electron microscope (TEM) as will be described later in Examples.

From the TEM observation of the resin plate prepared from the acrylic syrup of the present invention, the grafted rubbery polymer assumes a micro structure, as the HIPS resin, in which the resin is contained in the rubber phase. It has been known that the resin having such a micro structure generally exhibits a large shock resistance.

The acrylic syrup of the present invention can, depending upon the applications, be blended with a cure-promoting agent, a crosslinking agent, a filler and a parting agent, and can be molded into a variety of acrylic resin molded articles featuring improved impact resistance, and is very useful, particularly, for the production of artificial marble.

As the cure-promoting agent, though not limited thereto only, there can be used the polymerization initiator that was used for the production of the acrylic syrup, in an amount of, usually, from 0.1 to 5 parts by weight per 100 parts by weight of the acrylic syrup though the amount may vary depending upon the use. As the crosslinking agent, there can be used a compound containing a plurality of functional groups that react with the functional groups possessed by the polymerized component in the acrylic syrup, such as polyfunctional (meth)acrylate like ethylene glycol di(meth)acrylate, diethylene glycol di(meth)acrylate, propylene glycol di(meth)acrylate, neopentyl glycol di(meth)acrylate, spiroglycol di(meth)acrylate, dioxane glycol di(meth)acrylate, trimethylolpropane tri(meth)acrylate, and pentaerythritol tetra(meth)acrylate; epoxy(meth)acrylates; divinyl benzene, diallyl phthalate and triallyl isocyanulate, in one kind or in a combination of two or more kinds. The amount of addition of the crosslinking agent may be set depending upon the kind thereof, upon the combination with the syrup, upon the use of the molded article, and upon the desired properties.

There is no particular limitation on the filler, and there can be used such inorganic fillers as aluminum hydroxide, silica, glass powder, calcium carbonate, barium sulfate, alumina, talc, milled fiber, siliceous sand, river sand, diatomaceous earth, mica powder, gypsum, white marble sand and asbestos, as well as organic fillers such as polymer beads and the like. These fillers can be used alone or being mixed in two or more kinds. There is no particular limitation on the average particle diameter of the filler provided it can be homogeneously dispersed in the acrylic syrup. Further, the amount of blending the filler is usually from 50 to 400 parts by weight, preferably, from 100 to 300 parts by weight and, more preferably, from 150 to 250 parts by weight when, for example, an artificial marble is to be produced though it may vary depending upon the kind thereof, upon the composition of the acrylic syrup or upon the use of the acrylic syrup. When the amount of blending the filler is smaller than 50 parts by weight, the surface hardness and rigidity of the obtained artificial marble become insufficient. When the amount of blending the filler exceeds 400 parts by weight, on the other hand, the workability becomes poor during the molding.

As the parting agent, there can be used, for example, stearic acid, zinc stearate, aluminum stearate, calcium stearate, barium stearate, amide stearate, triphenyl phosphate, alkyl phosphate, various waxes and silicone oil, in amounts known per se. in one kind or in a combination of two or more kinds.

The above-mentioned acrylic syrup may be further blended with known resinous blending agents such as fiber reinforced material, shrinking-lowering agent, lubricant, plasticizer, viscosity-improving agent, diluent such as organic solvent, leveling agent, sedimentation-preventing agent, antioxidant, UV absorber, light stabilizer, pigment and/or dye.

As described above, the acrylic syrup of the present invention is blended with the above-mentioned various agents, and is preferably used as a compression-molding material like SMC or BMC, as a pre-mixing material, as a casting material, as a drawing material or as an extrusion-molding material.

The SMC can be easily produced by using a so-called SMC-producing apparatus. For example, the SMC can be molded by the heated press molding at 60 to 160° C. or by the injection molding. The BMC can be easily produced by using a double-armed kneader or the like kneader. For example, the BMC can be molded by the heated press molding at 60 to 160° C. or by the injection molding. To obtain resin molded articles or resin plates of various shapes by the injection-molding method, a traditionally known method can be directly applied. For example, the plate can be injection-molded continuously or batchwise. As for the batchwise method, a mixture of the syrup and the curing agent mixed together with stirring and deaerated, is poured into a cell assembled by holding gaskets such as of a soft polyvinyl chloride along the peripheries of two pieces of reinforced glass plates by using metallic fastening fittings. The cell is then heat-treated in a water bath or in an air bath maintained at a predetermined temperature to complete the polymerization, followed by cooling and, then, the plate-like polymer is taken out.

The acrylic resin molded article obtained from the acrylic syrup of the present invention exhibits excellent impact resistance and is very advantageous for the applications where impact resistance is required. The artificial marble obtained from the acrylic syrup can be preferably used as a material for the kitchen counter, washstand, dressing table, bathtub, floors and walls.

EXAMPLES

The invention will now be described by way of Working Examples to which only, however, the invention is in no way limited.

In the following Examples, properties of the acrylic syrup were measured and the resin molded articles were evaluated by the methods described below.
Polymerized Solid Component:

100 Parts by weight of the sample acrylic syrup was added dropwise to 1000 parts by weight of cold hexane (15° C.), and the obtained precipitate was dried under a reduced pressure in compliance with JIS K0067 until the weight thereof became constant in order to find the amount (% by weight) of the polymerized solid component in the acrylic syrup.

Further, the weight average molecular weight of the polymerized solid component was found by using the gel permeation chromatography (GPC; Model 8010, manufactured by Toso Co).
Viscosity:

The viscosity of the acrylic syrup was measured at 25° C. by using a type B viscometer (BM type, manufactured by Toki Sangyo Co.).
Average Particle Diameter of the Grafted Rubber:

A 4-mm thick plate was cast-molded by using the acrylic syrup relying upon the cell-casting method, a very thin piece cut from the cast-molded plate was died with osmic acid and was photographed by using a transmission-type electron microscope (TEM; JEM-1200EX II, manufactured by Nihon Densi Co.) to find an average particle diameter of the grafted rubber which has been died. Branching Coefficient of the Grafted Rubber:

By using a gel permeation chromatography (Shodex-11 manufactured by Showa Denko Co.) and a multi-angle laser light scattering-measuring instrument (Wyatt DAWN EOS manufactured by Wyatt Technology Co.), the inclination of an RMS radius-molecular weight double-logarithmic line (ordinate representing the RMS value, and the abscissa representing the molecular weight) was found under the following conditions by the GPC-MALLs measurement. The smaller the value of inclination, the larger the branching coefficient of the polymer.

Isolation column: three Shodex HFIP-806M
Column temperature: 40° C.
Transfer phase solvent: hexafluoroisopropanol (HFIP) containing 2 nmol of sodium trifluoroacetate
Flow speed of transfer phase: 0.96 ml/min Impact Resistance and Surface Hardness:

The impact resistance of the above injection-molded plate was evaluated in terms of the Izod impact value (with notch) in compliance with JIS K7110 by using a shock resistance tester manufactured by Ueshima Seisakusho Co., and the surface hardness of the injection molded plate was measured based upon the pencil-scratching method specified under JIS K5400.

Example 1

An initial heeding solution comprising 450 g of methyl methacrylate was thrown into a 2-liter separable four-neck distillation flask equipped with a thermometer, a reflux cooler, a metering pump and a stirrer. Into the above solution was dissolved 50 g of a styrene/butadiene rubber (rubbery polymer, NS-310S, manufactured by Nihon Zeon Co.), and the mixture was stirred at 100 rpm, substituted by nitrogen for 30 minutes at a blowing rate of 50 ml/min. and, then, the temperature was raised.

When the temperature has reached 100° C. and the reflux has started, 3.6 g of 1-dodecanethiol (chain transfer agent) was quickly added thereto (post-addition), and to which was, then, added dropwise a solution of 500 g of methyl mechacrylate in which 0.05 g of 1,1,3,3-tetramethylbutylperoxy-2-ethyl hexanoate (polymerization initiator) has been dissolved by using a metering pump at a rate of 2.8 g/minute for 3 hours.

After the dropwise addition has been finished, heating was continued for one hour followed by the addition of 0.2 g of 2,6-di-t-butyl-4-methylphenol (polymerization inhibitor) to discontinue the polymerization. Thereafter, the reaction system was cooled down to room temperature to obtain an acrylic syrup.

Accompanying the progress of the polymerization, the viscosity of the reaction solution has increased and bubbles have evolved. The bubbles, however, were readily broken on the interface, and no foam phase was seen even in the last stage of the polymerization or at the end of the polymerization, enabling the polymerization to be stably conducted. No scale has occurred, either, on the wall surfaces of the flask.

The polymerized solid component was contained in an amount of 30.6% by weight in the obtained syrup, possessing a weight average molecular weight (Mw) of 82,000 as measured by the gel permeation chromatography (GPC) and exhibiting a viscosity at 25° C. of 2.3 Pa·s.

The inclination of the RMS radius-molecular weight double-logarithimic line was calculated by the GPC-MALLS measurement to be 0.44 [nm/(g/mol)].

To 100 parts by weight of the syrup were added 200 parts by weight of aluminum hydroxide (CW308B manufactured by Sumitomo Kagaku Kogyo Co.) having an average particle diameter of 8 μm and treated with silane, 1 part by weight of 1,1,3,3-tetramethylbutylperoxy-2-ethyl hexanoate (cure-promoting agent, Perocta O, manufactured by Nihon Yushi Co.) and 3 parts by weight of trimethylolpropane trimethacrylate (crosslinking agent), which were then mixed together with stirring followed by deaeration under a reduced pressure.

A cell was formed by holding 4-mm thick gaskets of vinyl chloride between two pieces of glass plates, and the compound obtained above was heated in a constant-temperature water vessel at 50° C. for one hour, at 70° C. for one hour and, then, in a blower-type drier at 130° C. for one hour. Thereafter, the compound was cooled down to room temperature to obtain a resin plate having a thickness of 4 mm.

The resin plate exhibited an Izod impact value of 3.9 kJ/m$^2$. The surface hardness of the resin plate was 5H, and the average particle diameter of the rubbery polymer (grafted rubber) measured relying upon the TEM observation was 3 μm.

Example 2

An acrylic syrup was obtained in the same manner as in Example 1 using the same apparatus as that of Example 1 but adding 0.10 g of stearic acid monoglyceride (defoaming agent) to the initial feeding solution, changing the amount of addition of 1-dodecanethiol (chain transfer agent) into 1.3 g and changing the amount of 1,1,3,3-tetramethylbutylperoxy-2-ethyl hexanoate (polymerization initiator) in the post-added solution into 0.025 g.

The foam phase due to an increase in the viscosity of the reaction solution was not seen even in the latter stage of the polymerization or at the end of the polymerization, and the polymerization was stably conducted. No scale has occurred, either, on the walls of the flask.

The polymerized solid component was contained in an amount of 21.8% by weight in the obtained syrup, possessing a weight average molecular weight (Mw) of 201,000 as measured by the GPC and exhibiting a viscosity at 25° C. of 3.5 Pa·s.

The inclination of the RMS radius-molecular weight double-logarithimic line was calculated by the GPC-MALLS measurement to be 0.54 [nm/(g/mol)].

By using the above syrup, a 4-mm thick resin plate was prepared by the cell-casting method in the same manner as in Example 1. The resin plate exhibited an Izod impact value of 4.2 kJ/m$^2$. The surface hardness of the resin plate was 5H, and the average particle diameter of the grafted rubber measured relying upon the TEM observation was 4 μm.

Example 3

An acrylic syrup was obtained in the same manner as in Example 1 using the same apparatus as that of Example 1 but changing the amount of addition of 1-dodecanethiol (chain transfer agent) into 2.8 g and changing the amount of 1,1,3,3-tetramethylbutylperoxy-2-ethyl hexanoate (polymerization initiator) in the post-added solution into 0.075 g.

The foam phase due to an increase in the viscosity of the reaction solution was not seen even in the latter stage of the polymerization or at the end of the polymerization, and the polymerization was stably conducted. No scale has occurred, either, on the walls of the flask. The polymerized solid component was contained in an amount of 35.1% by weight in the obtained syrup, possessing a weight average molecular weight (Mw) of 104,000 as measured by the GPC and exhibiting a viscosity at 25° C. of 10.0 Pa·s.

The inclination of the RMS radius-molecular weight double-logarithimic line was calculated by the GPC-MALLS measurement to be 0.47 [nm/(g/mol)].

By using the above syrup, a 4-mm thick resin plate was prepared by the cell-casting method in the same manner as in Example 1. The resin plate exhibited an Izod impact value of 3.8 kJ/m$^2$. The surface hardness of the resin plate was 5H, and the average particle diameter of the grafted rubber measured relying upon the TEM observation was 2 μm.

Example 4

An acrylic syrup was obtained in the same manner as in Example 1 using the same apparatus as that of Example 1 but changing the amount of methyl methacrylate which was the solution to be fed first into 480 g and changing the amount of the styrene/butadiene rubber into 20 g.

The foam phase due to an increase in the viscosity of the reaction solution was not seen even in the latter stage of the polymerization or at the end of the polymerization, and the polymerization was stably conducted. No scale has occurred, either, on the walls of the flask. The polymerized solid component was contained in an amount of 31.1% by weight in the obtained syrup, possessing a weight average molecular weight (Mw) of 82,000 as measured by the GPC and exhibiting a viscosity at 25° C. of 2.1 Pa·s.

The inclination of the RMS radius-molecular weight double-logarithimic line was calculated by the GPC-MALLS measurement to be 0.47 [nm/(g/mol)].

By using the above syrup, a 4-mm thick resin plate was prepared by the cell-casting method in the same manner as in Example 1. The resin plate exhibited an Izod impact value of 2.7 kJ/m$^2$. The surface hardness of the resin plate was 5H, and the average particle diameter of the grafted rubber measured relying upon the TEM observation was 2 μm.

Example 5

An acrylic syrup was obtained in the same manner as in Example 1 using the same apparatus as that of Example 1 but changing the amount of methyl methacrylate which was the solution to be fed first into 400 g, changing the amount of the styrene/butadiene rubber into 100 g, and changing the amount of addition of 1-dodecanethiol (chain transfer agent) into 2.8 g.

The foam phase due to an increase in the viscosity of the reaction solution was not seen even in the latter stage of the polymerization or at the end of the polymerization, and the polymerization was stably conducted. No scale has occurred, either, on the walls of the flask. The polymerized solid component was contained in an amount of 29.7% by weight in the obtained syrup, possessing a weight average molecular weight (Mw) of 101,000 as measured by the GPC and exhibiting a viscosity at 25° C. of 5.8 Pa·s.

The inclination of the RMS radius-molecular weight double-logarithimic line was calculated by the GPC-MALLS measurement to be 0.48 [nm/(g/mol)].

By using the above syrup, a 4-mm thick resin plate was prepared by the cell-casting method in the same manner as in Example 1. The resin plate exhibited an Izod impact value of 3.7 kJ/m$^2$. The surface hardness of the resin plate was 5H, and the average particle diameter of the grafted rubber measured relying upon the TEM observation was 16 μm.

Example 6

An acrylic syrup was obtained in the same manner as in Example 1 using the same apparatus as that of Example 1 but using, as the rubbery polymer, a butadiene rubber (Nipol BR-1220 manufactured by Nihon Zeon Co.) instead of the styrene/butadiene rubber and changing the amount of addition of 1-dodecanethiol (chain transfer agent) into 2.8 g.

The foam phase due to an increase in the viscosity of the reaction solution was not seen even in the latter stage of the polymerization or at the end of the polymerization, and the polymerization was stably conducted. No scale has occurred, either, on the walls of the flask. The polymerized solid component was contained in an amount of 29.8% by weight in the obtained syrup, possessing a weight average molecular weight (Mw) of 104,000 as measured by the GPC and exhibiting a viscosity at 25° C. of 1.9 Pa·s.

The inclination of the RMS radius-molecular weight double-logarithimic line was calculated by the GPC-MALLS measurement to be 0.50 [nm/(g/mol)].

By using the above syrup, a 4-mm thick resin plate was prepared by the cell-casting method in the same manner as in Example 1. The resin plate exhibited an Izod impact value of 3.1 kJ/m². The surface hardness of the resin plate was 5H, and the average particle diameter of the grafted rubber measured relying upon the TEM observation was 8 μm.

Example 7

An acrylic syrup was obtained in the same manner as in Example 1 using the same apparatus as that of Example 1 but changing the amount of methyl methacrylate which was the solution to be fed first into 480 g, changing 50 g of the styrene/butadiene rubber into 20 g of the butadiene rubber, changing the amount of addition of 1-dodecanethiol (chain transfer agent) into 2.8 g, and changing the amount of the polymerization initiator into 0.075 g.

The foam phase due to an increase in the viscosity of the reaction solution was not seen even in the latter stage of the polymerization or at the end of the polymerization, and the polymerization was stably conducted. No scale has occurred, either, on the walls of the flask. The polymerizes solid component was contained in an amount of 30.9% by weight in the obtained syrup, possessing a weight average molecular weight (Mw) of 91,000 as measured by the GPC and exhibiting a viscosity at 25° C. of 4.3 Pa·s.

The inclination of the RMS radius-molecular weight double-logarithimic line was calculated by the GPC-MALLS measurement to be 0.49 [nm/(g/mol)].

By using the above syrup, a 4-mm thick resin plate was prepared by the cell-casting method in the same manner as in Example 1. The resin plate exhibited an Izod impact value of 2.5 kJ/m². The surface hardness of the resin plate was 5H, and the average particle diameter of the grafted rubber measured relying upon the TEM observation was 3 μm.

Comparative Example 1

A starting solution obtained by dissolving 100 g of the styrene/butadiene rubber in 1800 g of methyl methacrylate was preheated at 90° C. and was continuously fed into a 0.2-litter vessel-type reactor equipped with double helical ribbon vanes, and to which was further continuously fed a polymerization initiator solution (20° C.) obtained by dissolving 6 g of 1,1,3,3-tetramethylbutylperoxy-2-ethyl hexanoate in 200 g of methyl methacrylate, to continuously conduct the polymerization by maintaining an average residence time of the reaction mixture in the reactor to be 180 seconds. The stirring speed was maintained to be 180 rpm, the temperature was maintained to be 150° C. and the pressure was maintained to be 6.0 atms in the reaction vessel.

0.4 Grams of a 2,6-di-t-butyl-4-methylphenol was added to the syrup coming out of the reaction vessel to halt the polymerization, and, then, the mixture was cooled down to room temperature to obtain an acrylic syrup.

The polymerized solid component was contained in an amount of 28.6% by weight in the obtained syrup, possessing a weight average molecular weight (Mw) of 88,000 as measured by the GPC and exhibiting a viscosity at 25° C. of 1.2 Pa·s.

The inclination of the RMS radius-molecular weight double-logarithimic line was calculated by the GPC-MALLS measurement to be 0.74 [nm/(g/mol)].

By using the above syrup, a 4-mm thick resin plate was prepared by the cell-casting method in the same manner as in Example 1. The resin plate exhibited an Izod impact value of 1.8 kJ/m². The surface hardness of the resin plate was 4H, and the average particle diameter of the grafted rubber measured relying upon the TEM observation was 3 μm.

Comparative Example 2

An acrylic syrup was obtained in the same manner as in Example 1 using the same apparatus as that of Example 1 but changing the amount of methyl methacrylate which was the solution to be fed first into 500 g and adding no styrene/butadiene rubber.

The polymerized solid component was contained in an amount of 32.5% by weight in the obtained syrup, possessing a weight average molecular weight (Mw) of 81,000 as measured by the GPC and exhibiting a viscosity at 25° C. of 2.0 Pa·s.

The inclination of the RMS radius-molecular weight double-logarithimic line was calculated by the GPC-MALLS measurement to be 0.81 [nm/(g/mol)].

By using the above syrup, a 4-mm thick resin plate was prepared by the cell-casting method in the same manner as in Example 1. The resin plate exhibited an Izod impact value of 1.6 kJ/m². The surface hardness of the resin plate was 8H.

Comparative Example 3

An acrylic syrup was obtained in the same manner as in Example 1 using the same apparatus as that of Example 1 but changing the amount of methyl methacrylate which was the solution to be fed first into 500 g, adding no styrene/butadiene rubber, changing the amount of addition of 1-dodecanethiol (chain transfer agent) into 1.3 g and changing the amount of addition of the polymerization initiator into 0.025 g.

The polymerized solid component was contained in an amount of 22.3% by weight in the obtained syrup, possessing a weight average molecular weight (Mw) of 202,000 as measured by the GPC and exhibiting a viscosity at 25° C. of 3.2 Pa·s.

The inclination of the RMS radius-molecular weight double-logarithimic line was calculated by the GPC-MALLS measurement to be 0.80 [nm/(g/mol)].

By using the above syrup, a 4-mm thick resin plate was prepared by the cell-casting method in the same manner as in Example 1. The resin plate exhibited an Izod impact value of 2.0 kJ/m². The surface hardness of the resin plate was 8H.

Comparative Example 4

An acrylic syrup was obtained in the same manner as in Example 1 using the same apparatus as that of Example 1 but changing the styrene/butadiene rubber into the butadiene rubber, changing the amount of addition of the 1-dodecanethiol (chain transfer agent) into 16.5 g and changing the amount of the polymerization initiator into 0.125 g.

The obtained syrup possessed a degree of polymerization of 43.1%, a weight average molecular weight (Mw) of 19,000 as measured by the GPC and a viscosity at 25° C. of 3.1 Pa·s.

The inclination of the RMS radius-molecular weight double-logarithimic line was calculated by the GPC-MALLS measurement to be 0.60 [nm/(g/mol)].

By using the above syrup, a 4-mm thick resin plate was prepared by the cell-casting method in the same manner as in Example 1. The resin plate exhibited an Izod impact value of 1.0 kJ/m². The average particle diameter of the rubbery polymer of the resin plate measured relying upon the TEM observation was 10 μm. The surface hardness of the resin plate was 4H.

Comparative Example 5

50 Grams of the styrene/butadiene rubber and 1000 g of the acrylic syrup (containing 32.5% by weight of a polymerized solid component, having a weight average molecular weight of 81,000 and having a viscosity of 2.0 Pa·s) obtained in Comparative Example 1, were put into the 2-liter separable four-neck distillation flask used in Example 1, and were stirred until the rubber component was dissolved.

After the rubber component was dissolved, the syrup contained 37.7% by weight of the nonvolatile component, possessed a weight average molecular weight (Mw) of 89,000 as measured by the GPC and a viscosity at 25° C. of 4.1 Pa·s.

The inclination of the RMS radius-molecular weight double-logarithimic line was calculated by the GPC-MALLS measurement to be 0.80 [nm/(g/mol)].

When the syrup was left to stand in a cool and dark place for extended periods of time, the rubber components were separated, and the syrup as a whole became inhomogeneous.

The syrup was stirred again until it became homogeneous, and a 4-mm thick resin plate was prepared by the cell-casting method in the same manner as in Example 1. The resin plate exhibited an Izod impact value of 1.9 kJ/m². No grafted rubber was observed on the resin plate based on the TEM observation. The surface hardness of the resin plate was as low as 3H.

Comparative Example 6

A mixed solution of the styrene/butadiene rubber and the acrylic syrup was prepared in the same manner as in Comparative Example 4 but changing the amount of the styrene/butadiene rubber into 75 g. The mixed solution contained the nonvolatile component in an amount of 41.9%, and possessed a weight average molecular weight (Mw) of 90,000 as measured by the GPC and a viscosity at 25° C. of 4.7 Pa·s.

The inclination of the RMS radius-molecular weight double-logarithimic line was calculated by the GPC-MALLS measurement to be 0.81 [nm/(g/mol)].

When the syrup was left to stand in a cool and dark place for extended periods of time, the rubber components were separated, and the syrup as a whole became inhomogeneous.

The mixed solution was stirred again until it became homogeneous, and a 4-mm thick resin plate was prepared by the cell-casting method in the same manner as in Example 1. The resin plate exhibited an Izod impact value of 2.4 kJ/m². No grafted rubber was observed from the TEM observation of the resin plate. The surface hardness of the resin plate was as very low as 1H.

Comparative Example 7

A mixed solution of the butadiene rubber and the acrylic syrup was prepared in the same manner as in Comparative Example 4 but using a butadiene rubber (Nipol BR-1220 manufactured by Nihon Zeon Co.) instead of the styrene/butadiene rubber. The mixed solution contained the nonvolatile component in an amount of 36.7% by weight, and possessed a weight average molecular weight (Mw) of 143,000 as measured by the GPC, and a viscosity at 25° C. of 5.6 Pa·s.

The inclination of the RMS radius-molecular weight double-logarithimic line was calculated by the GPC-MALLS measurement to be 0.83 [nm/(g/mol)].

When the syrup was left to stand in a cool and dark place for extended periods of time, the rubber components were separated, and the syrup as a whole became inhomogeneous.

The mixed solution was stirred again until it became homogeneous, and a 4-mm thick resin plate was prepared by the cell-casting method in the same manner as in Example 1. The resin plate exhibited an Izod impact value of 2.3 kJ/m². No grafted rubber was observed from the TEM observation of the resin plate. The surface hardness of the resin plate was as very low as 2H.

What is claimed is:

1. An acrylic syrup having a viscosity at 25° C. of from 0.1 to 50 Pa·s and containing:
    a vinyl monomer (A) which comprises not less than 85% by weight of methyl methacrylate and not more than 15% by weight of a vinyl compound selected from the group consisting of acrylonitrile, methacrylonitrile, styrene, alpha-methylstyrene, dimethylstyrene, vinyltoluene, chlorostyrene, acrylic acid, methacrylic acid, maleic acid, fumaric acid and vinyl acetate, and
    a polymerized solid component (B) which is a high polymer of said vinyl monomer and has a weight average molecular weight of from 30,000 to 2,000,000 as measured by the GPC,
    wherein at least part of said polymerized solid component (B) is:
        (i) a grafted rubber obtained by graft-polymerizing said vinyl monomer with a rubbery polymer, by employing a half-batch polymerization method, wherein the rubbery polymer consists of a non-hydrogenated styrene/butadiene copolymer that is added at a ratio of 2 to 20 parts by weight per 100 parts by weight of a total amount of said vinyl monomer (A),
        (ii) said high polymer of said vinyl monomer except the grafted rubber and
        (iii) said vinyl monomer which is graft-polymerized with the rubbery polymer;
    and wherein said grafted rubber has a branching coefficient with which the slope obtained by double logarithmically plotting the RMS radius (z-average inertial radius) calculated from the GPC-MALLS (gel permeation chromatography-multi-angle laser light scattering) measurement and the molecular weight, is 0.35 to 0.65 (nm/(g/mol)).

2. An acrylic syrup according to claim 1, wherein said vinyl monomer (A) is contained in an amount of from 40 to 90% by weight, and said polymerized solid component (B) is contained in an amount of from 10 to 60% by weight, subject to 100% by weight of the total amount of said vinyl monomer (A) and said polymerized solid component (B).

3. An acrylic syrup according to claim 1, wherein said vinyl monomer (A) is contained in an amount of from 45 to 88% by weight, and said polymerized solid component (B) is contained in an amount of from 55 to 12% by weight, subject to 100% by weight of the total amount of said vinyl monomer (A) and said polymerized solid component (B).

\* \* \* \* \*